United States Patent
Farrow et al.

(10) Patent No.: US 7,635,267 B2
(45) Date of Patent: Dec. 22, 2009

(54) APPARATUS AND METHOD FOR RETAINING OPTION CARD IN A COMPUTER SYSTEM

(75) Inventors: Timothy Samuel Farrow, Cary, NC (US); William Fred Martin-Otto, Apex, NC (US); Albert Vincent Makley, Raleigh, NC (US); Russell Alan Resnick, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 96 days.

(21) Appl. No.: 11/959,547

(22) Filed: Dec. 19, 2007

(65) Prior Publication Data

US 2009/0163060 A1 Jun. 25, 2009

(51) Int. Cl.
*G06F 1/16* (2006.01)

(52) U.S. Cl. ............... 439/61; 439/237; 361/679.32 N

(58) Field of Classification Search .................. 439/61, 439/327, 325, 237; 361/679.32, 679.31, 361/679.58
See application file for complete search history.

(56) References Cited

U.S. PATENT DOCUMENTS

| | | | | |
|---|---|---|---|---|
| 6,738,261 | B2 * | 5/2004 | Vier et al. | 361/740 |
| 7,001,002 | B2 * | 2/2006 | Wei | 312/223.2 |
| 7,120,032 | B2 * | 10/2006 | Lin et al. | 361/801 |
| 7,161,798 | B2 * | 1/2007 | Chen et al. | 361/679.32 |
| 2005/0148228 | A1 * | 7/2005 | Jing et al. | 439/325 |
| 2005/0265005 | A1 * | 12/2005 | Han et al. | 361/726 |
| 2006/0128171 | A1 * | 6/2006 | Schmidt et al. | 439/61 |
| 2008/0074850 | A1 * | 3/2008 | Kuo | 361/740 |

\* cited by examiner

*Primary Examiner*—Gary F. Puamen
(74) *Attorney, Agent, or Firm*—Lieberman & Brandsdorfer, LLC

(57) ABSTRACT

Option cards—one or more as may be installed in a particular computer system—are retained in position against possibly dislodgement due to handling by a frame and cooperating cross bar and depending member elements which may be variously positioned relative to the frame.

24 Claims, 5 Drawing Sheets

APPARATUS AND METHOD FOR RETAINING OPTION CARD IN A COMPUTER SYSTEM

FIELD AND BACKGROUND OF INVENTION

This invention relates to computer systems and more particularly to the retention of an option card disposed in an option slot against displacement such as may occur by the imposition of forces during shipment or handling.

As persons of skill in the appropriate arts will recognize, it has long been the practice to provide additional capability, such as video or audio processing and input/output, for computer systems by the provision of option cards. Such cards interface with the computer system by being mounted in connectors provided on a motherboard and also known as option card slots. High capability full height option cards (such as RAID controllers and audio or sound cards0 frequently provide additional connectors along a side edge of the card remote from the slot connector into which the card is inserted. Lower capability option cards are sometimes configured to use lower height or low profile printed circuit boards, saving some cost in the manufacture of the card. These different characteristics of option cards present an interesting problem in assuring that the cards are retained in position.

With the high capability card, any structure which will engage the card to retain it in place must touch the edge of the card in a location which leaves the additional connector available for use. With the lower capability card, any structure which will engage the card to retain it in place must touch the edge of the card while also accommodating contact with a higher capability card which may be occupying an adjacent slot.

SUMMARY OF THE INVENTION

With the foregoing in mind, it is a purpose of this invention to assure that option cards—one or more as may be installed in a particular system—are retained in position against possibly dislodgement due to handling. In realizing this purpose, the present invention provides apparatus and methods which accommodate cards which may have upper edge connection points and cards which may be of varying heights. This is accomplished by providing a structure of a frame and cooperating elements which may be variously positioned relative to the frame to accomplish the stated purposes.

BRIEF DESCRIPTION OF DRAWINGS

Some of the purposes of the invention having been stated, others will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Figure 3:
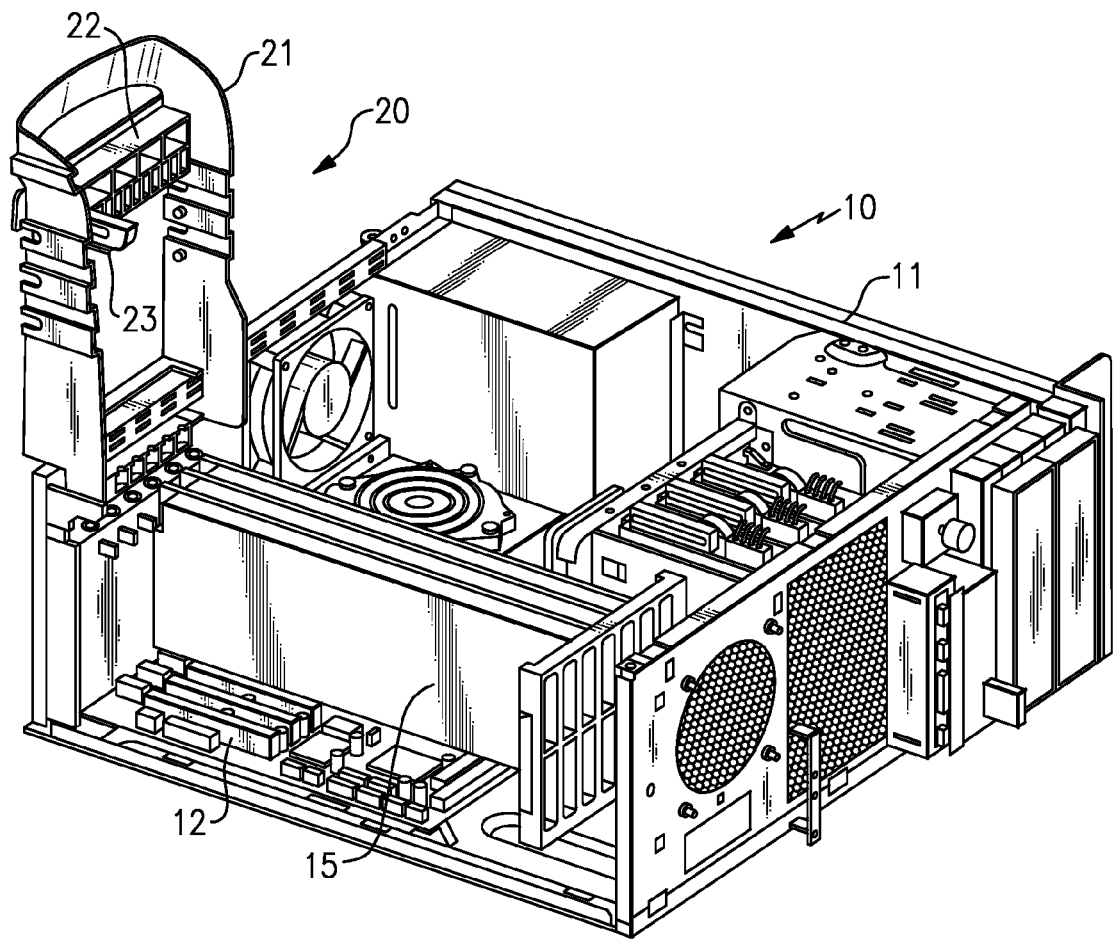
FIG. 3 is a perspective view showing the elements of FIGS. 1 and 2 as implemented in a computer system.
Figure 4:
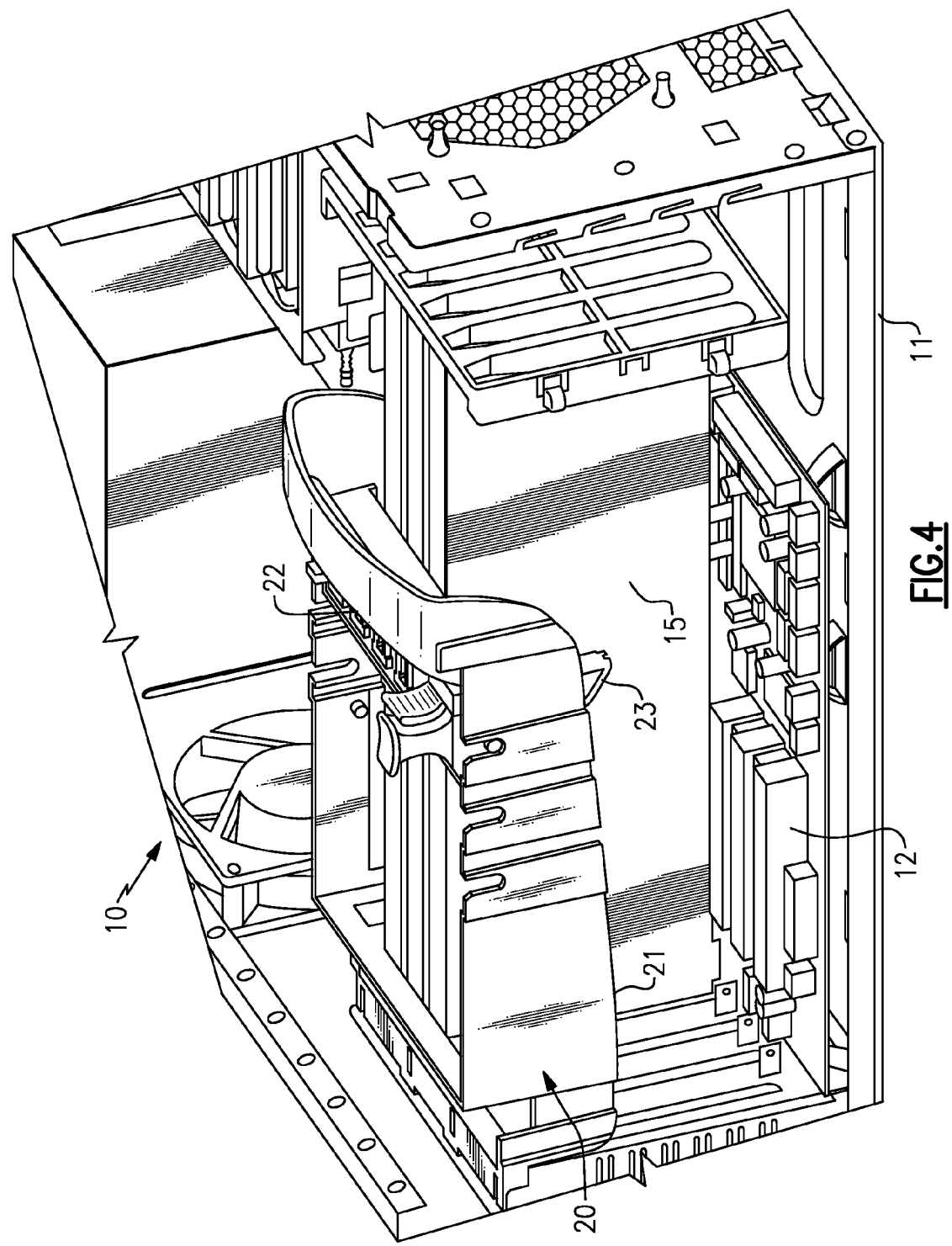
FIG. 4 is an enlarged scale perspective view similar to FIG. 3.
Figure 5:
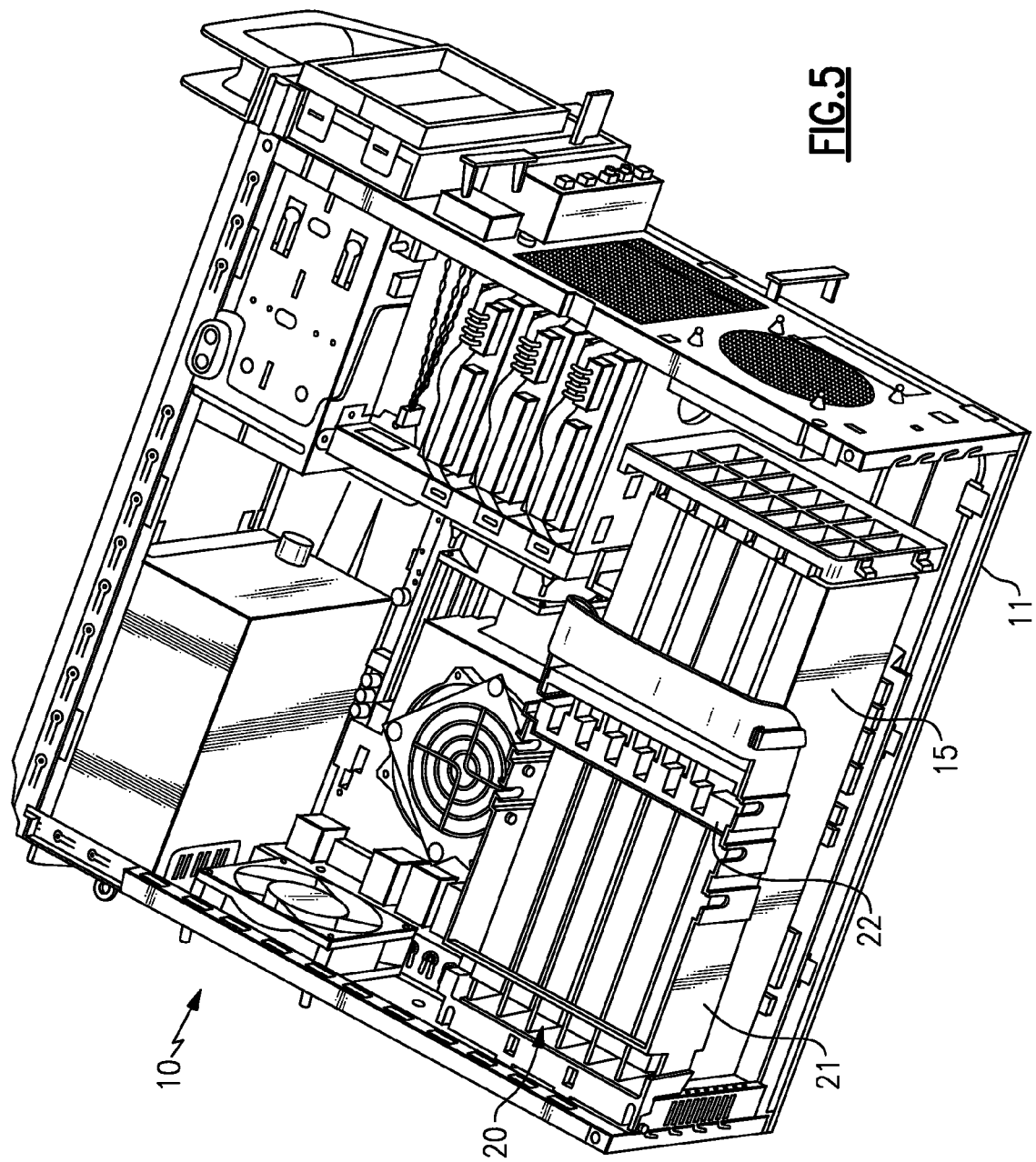
FIG. 5 is a view similar to FIG. 3 from a slightly different viewpoint.

Referring now to FIG. 3 through 5, one implementation of this invention is in a computer system such as that indicated generally at 10 in those Figures. The system has a casing 11 and a plurality of elongate connectors (12 in FIGS. 3 and 4) defining option card slots. Typically, when prepared for use and for shipment to an end user, the system 10 has at least one elongate option card 15 mounted in one of said slots. Frequently, a system will have a plurality of cards each mounted in a corresponding slot, as illustrated in FIG. 5.

Figure 1:
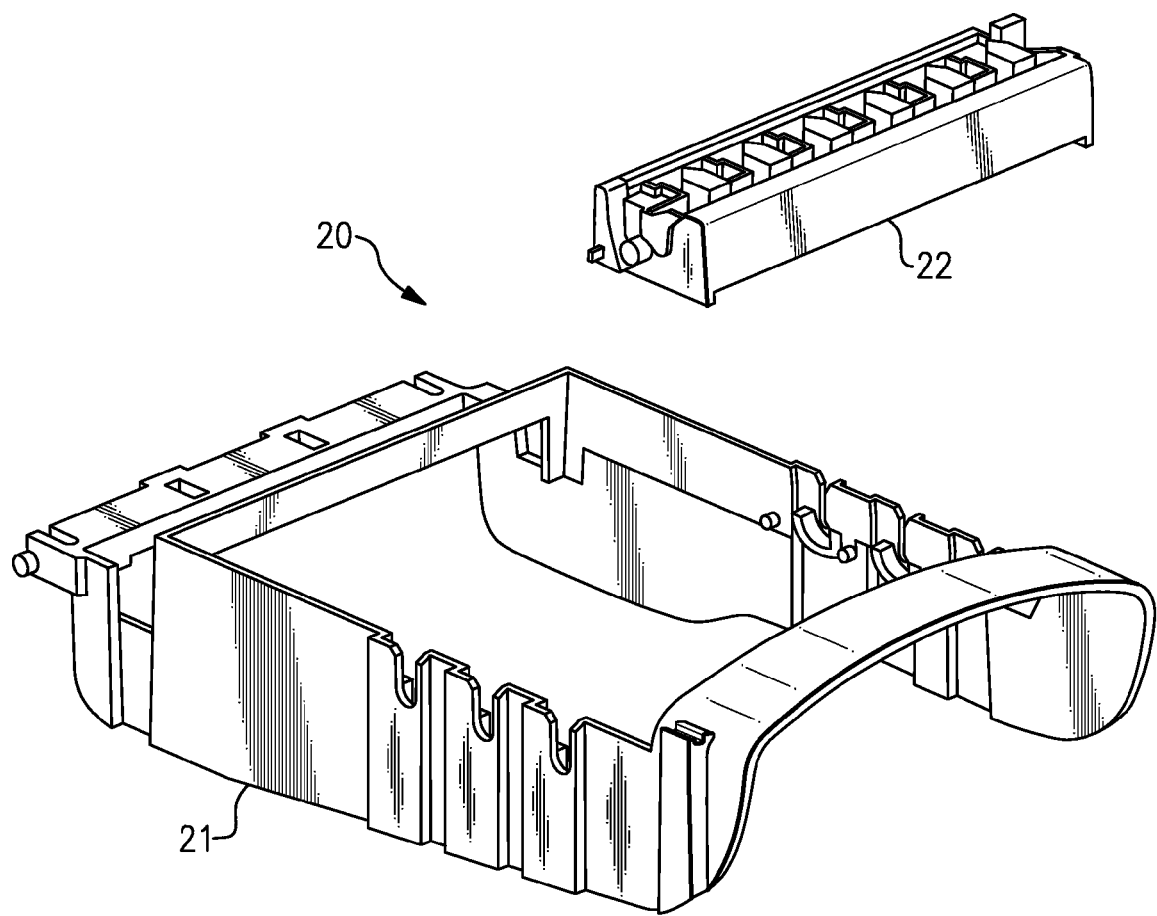
FIG. 1 is a perspective view of two elements of the apparatus of this invention.
Figure 2:
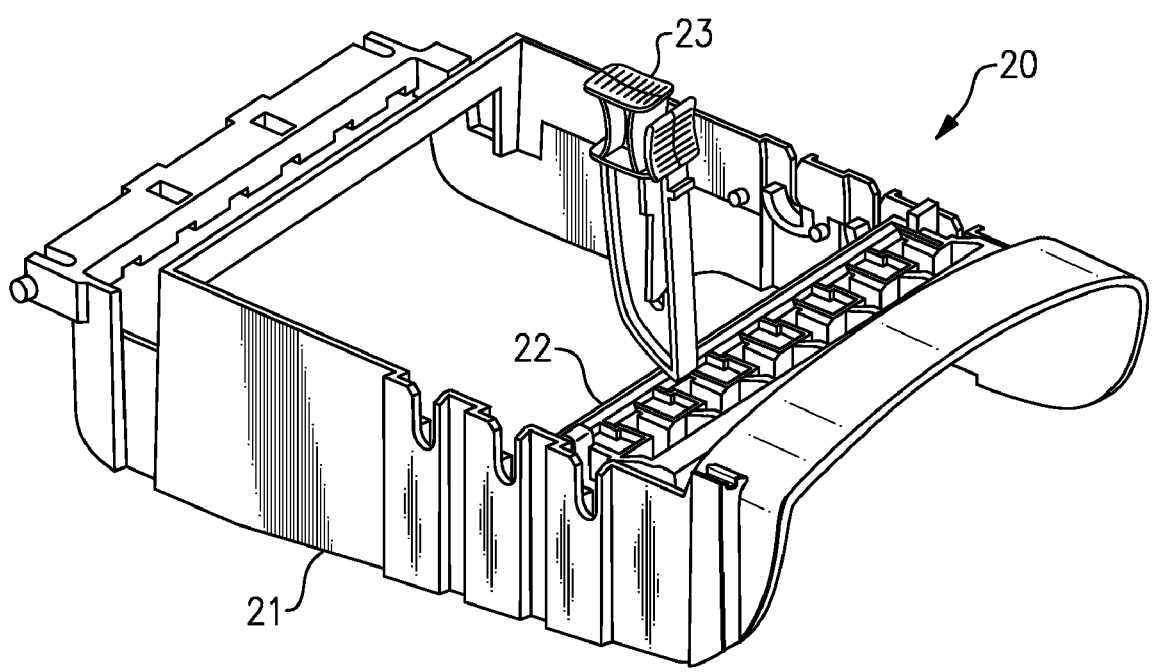
FIG. 2 is a perspective view similar to FIG. 1, showing the two elements there illustrated and a third element.

In accordance with important features of this invention, a retainer indicated generally at 20 is provided engaging the casing 11 and one or more cards to and secure engaged cards against dislodgement during handling of the system. The retainer 20 comprises a rectilinear frame 21 which, in FIGS. 3 through 5, is coupled to the casing 11 for pivotal movement relative thereto. A cross bar member 22 is removably coupled to the frame 21 and positioned therealong to extend transversely of the connectors 12 and engage an edge of a mounted card opposite the connectors. As more clearly illustrated in FIGS. 1 and 2, the frame 21 is an elongated rectangle and the cross bar member 22 is positionable at a plurality of locations therealong. Note, In FIGS. 1 and 2, the projection formed at a terminal end of the cross bar member and the slots disposed along the length of the side wall portions of the rectangular frame. By moving the cross bar to various positions along the frame, cards may be accommodated which have upper side edge connectors to which some circuitry is to be attached. The pivotal attachment between the frame 21 and the casing 11 provides a coupling allowing pivotal movement of the frame between a position withdrawn from a card (FIG. 3) and a position in which the cross bar member engages said card (FIGS. 4 and 5) This coupling is preferably at one end of the frame.

The invention further contemplates the provision, where indicated, of a depending member 23 (FIGS. 2 and 3) removably coupled to the cross bar member and positioned therealong to extend perpendicularly to the plane of the frame 21 and engage an edge of a card opposite the connectors. The depending member 23 can be positioned variously along the cross bar member, to overly any selected slot into which a low profile card is to be inserted. Further, the depending member is positionable to extend at a plurality of distances from said cross bar member in accommodation of cards of varying heights.

It will be understood that the invention has here been described in the full combination of the elements with a computer system having installed cards. However, implementation of the invention will, perforce, pass through subcombination stages where the system may have no option cards yet installed and where the two or three elements of the retainer assembly have been formed and are yet to be assembled with the computer system.

In implementing the invention, the practice of assembling the retainer with a computer system presents a method of assembly in which an option card is mounted in an option card slot of a computer system and the card is retained in position by adjusting the position of a cross bar member in a retainer frame to position the cross bar member to engage the mounted option card at a side edge portion opposite the option card slot which lacks any auxiliary connection point and moving the retainer frame and crossbar into position engaging the option card to be retained. Such a method may further comprises positioning the cross bar member to span a plurality of option cards mounted in a plurality of option card slots and inserting a depending member into the cross bar member and adjusting the depending member to extend toward a reduced height option card and engage the reduced height option card at a side edge portion opposite the option card slot in which the reduced height option card is received.

In the drawings and specifications there has been set forth a preferred embodiment of the invention and, although specific terms are used, the description thus given uses terminology in a generic and descriptive sense only and not for purposes of limitation.

What is claimed is:

1. An apparatus comprising:
    a computer system having a casing and a plurality of elongate connectors defining option card slots;
    an elongate option card mounted in one of said slots; and
    a retainer engaging said casing and said card and securing said card in said slot against dislodgement; said retainer comprising:
        a rectilinear frame coupled to said casing; and
        a cross bar member removably coupled to said frame and positioned to extend transversely of said connectors and engage an edge of said card opposite said connectors.

2. Apparatus according to claim 1 wherein said frame is an elongated rectangle and said cross bar member is positionable at a plurality of locations therealong.

3. Apparatus according to claim 1 wherein said frame is coupled to said casing for pivotal movement between a position withdrawn from said card and a position in which said cross bar member engages said card.

4. Apparatus according to claim 3 wherein said frame is coupled to said casing at one end of said frame.

5. Apparatus according to claim 1 further comprising a depending member removably coupled to said cross bar member and positioned therealong to extend perpendicularly to the plane of said frame and engage an edge of a card opposite said connectors.

6. Apparatus according to claim 5 wherein said depending member is positionable at a plurality of locations along said cross bar member.

7. Apparatus according to claim 5 wherein said depending member is positionable to extend at a plurality of distances from said cross bar member in accommodation of cards of varying heights.

8. Apparatus comprising:
    a computer system having a casing and a plurality of elongate connectors defining option card slots; and
    a retainer engaging said casing and securing a card disposed in one of said slots against dislodgement; said retainer comprising:
        a rectilinear frame coupled at one end to said casing; and
        a cross bar member, internal to the casing, removably coupled to said frame and positioned to extend transversely of said connectors and engage an edge of a card opposite said connectors.

9. Apparatus according to claim 8 wherein said frame is an elongated rectangle and said cross bar member is positionable at a plurality of locations therealong.

10. Apparatus according to claim 8 wherein said frame is coupled to said casing for pivotal movement between a position withdrawn from an engaged card and a position in which said cross bar member engages such a card.

11. Apparatus according to claim 10 wherein said frame is coupled to said casing at one end of said frame.

12. Apparatus according to claim 8 further comprising a depending member removably coupled to said cross bar member and positioned therealong to extend perpendicularly to the plane of said frame and engage an edge of a card opposite said connectors.

13. Apparatus according to claim 12 wherein said depending member is positionable at a plurality of locations along said cross bar member.

14. Apparatus according to claim 12 wherein said depending member is positionable to extend at a plurality of distances from said cross bar member in accommodation of cards of varying heights.

15. Apparatus comprising:
    a retainer which engages a computer system casing and secures a card disposed in an option card slot against dislodgement; said retainer comprising:
        a rectilinear frame; and
        a cross bar member removably coupled to said frame and positioned to extend transversely of and engage an edge of a card disposed in an option card slot, said engaged cross member parallel to a mating edge of said slot.

16. Apparatus according to claim 15 wherein said frame is an elongated rectangle and said cross bar member is positionable at a plurality of locations therealong.

17. Apparatus according to claim 15 wherein said frame couples to a casing for pivotal movement between a position withdrawn from an engaged card and a position in which said cross bar member engages such a card.

18. Apparatus according to claim 17 wherein said frame couples to a casing at one end of said frame.

19. Apparatus according to claim 15 further comprising a depending member removably coupled to said cross bar member and positioned therealong to extend perpendicularly to the plane of said frame and engage an edge of a card.

20. Apparatus according to claim 19 wherein said depending member is positionable at a plurality of locations along said cross bar member.

21. Apparatus according to claim 19 wherein said depending member is positionable to extend at a plurality of distances from said cross bar member in accommodation of cards of varying heights.

22. A method comprising:
    mounting an option card in an option card slot of a computer system; and
    retaining the option card disposed in the slot by adjusting the position of a cross bar member in a retainer frame to position the cross bar member to engage the mounted option card at a side edge portion opposite the option card slot which lacks any auxiliary connection point and moving the retainer frame and crossbar into position engaging the option card to be retained.

23. The method according to claim 22 further comprising inserting a depending member into the cross bar member and adjusting the depending member to extend toward a reduced height option card and engage the reduced height option card at a side edge portion opposite the option card slot in which the reduced height option card is received.

24. The method according to claim 22 further comprising positioning the cross bar member to span a plurality of option cards mounted in a plurality of option card slots.

* * * * *